(12) United States Patent
Maekawa et al.

(10) Patent No.: US 12,195,622 B2
(45) Date of Patent: Jan. 14, 2025

(54) POLYCARBONATE RESIN COMPOSITION OR COPOLYMER, AND OPTICAL FILM

(71) Applicant: TEIJIN LIMITED, Osaka (JP)

(72) Inventors: Shoichi Maekawa, Osaka (JP); Yohei Okada, Osaka (JP)

(73) Assignee: TEIJIN LIMITED, Osaka (JP)

( * ) Notice: Subject to any disclaimer, the term of this patent is extended or adjusted under 35 U.S.C. 154(b) by 629 days.

(21) Appl. No.: 17/430,500

(22) PCT Filed: Feb. 3, 2020

(86) PCT No.: PCT/JP2020/003920
§ 371 (c)(1),
(2) Date: Aug. 12, 2021

(87) PCT Pub. No.: WO2020/166408
PCT Pub. Date: Aug. 20, 2020

(65) Prior Publication Data
US 2022/0135795 A1    May 5, 2022

(30) Foreign Application Priority Data

Feb. 13, 2019 (JP) ................................. 2019-023648

(51) Int. Cl.
| | |
|---|---|
| C08L 69/00 | (2006.01) |
| C08G 64/02 | (2006.01) |
| C08G 64/08 | (2006.01) |
| C08G 64/16 | (2006.01) |
| C08G 64/30 | (2006.01) |
| C08J 5/18 | (2006.01) |
| G02F 1/1333 | (2006.01) |

(52) U.S. Cl.
CPC ........ *C08L 69/005* (2013.01); *C08G 64/0291* (2013.01); *C08G 64/085* (2013.01); *C08G 64/16* (2013.01); *C08G 64/1608* (2013.01); *C08G 64/307* (2013.01); *C08J 5/18* (2013.01); *C08L 69/00* (2013.01); *G02F 1/133308* (2013.01); *C08J 2369/00* (2013.01); *C08L 2201/08* (2013.01); *C08L 2201/10* (2013.01); *C08L 2203/20* (2013.01); *C08L 2205/025* (2013.01)

(58) Field of Classification Search
CPC ...... C08L 69/00; C08J 2369/00; C08G 64/16; C08G 64/307
See application file for complete search history.

(56) References Cited

U.S. PATENT DOCUMENTS

| | | | | |
|---|---|---|---|---|
| 5,486,577 | A | * | 1/1996 | Farah ...................... C08L 69/00 525/462 |
| 5,858,499 | A | * | 1/1999 | Abe ................... C08G 64/1608 528/196 |
| 2010/0104777 | A1 | | 4/2010 | Motoyoshi et al. |
| 2012/0120356 | A1 | | 5/2012 | Washizu et al. |
| 2013/0345347 | A1 | | 12/2013 | Steendam et al. |
| 2014/0285888 | A1 | | 9/2014 | Tanaka et al. |
| 2016/0181576 | A1 | | 6/2016 | Zouta et al. |
| 2017/0190907 | A1 | | 7/2017 | Grieshaber et al. |
| 2018/0312688 | A1 | | 11/2018 | Tsunemori et al. |

FOREIGN PATENT DOCUMENTS

| | | |
|---|---|---|
| CN | 102257412 | 11/2011 |
| CN | 103930807 | 7/2014 |
| CN | 104428343 | 3/2015 |
| EP | 2 163 922 | 3/2010 |
| JP | 8-134199 | 5/1996 |
| JP | 9-268225 | 10/1997 |
| JP | 2001-194530 | 7/2001 |
| JP | 2001-206944 | 7/2001 |
| JP | 2001-296423 | 10/2001 |
| JP | 2003-90901 | 3/2003 |
| JP | 2004-331688 | 11/2004 |

(Continued)

OTHER PUBLICATIONS

Supplementary European Search Report issued Jul. 8, 2022 in European Patent Application No. 20755326.4.
International Search Report issued Mar. 17, 2020 in International (PCT) Application No. PCT/JP2020/003920.

*Primary Examiner* — David J Buttner
*Assistant Examiner* — Surbhi M Du
(74) *Attorney, Agent, or Firm* — Wenderoth, Lind & Ponack, L.L.P.

(57) ABSTRACT

A polycarbonate resin composition or a copolymer, comprising, as main repeating units, a carbonate unit (a-1) having a fluorene ring in a side chain, a carbonate unit (a-2) represented by the following formula (a-2):

[Chem. 1]

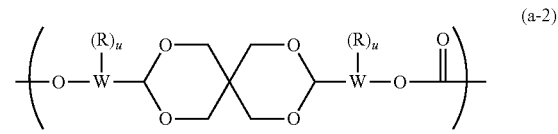

(a-2)

(wherein W represents an alkylene group having 1 to 20 carbon atoms or a cycloalkylene group having 6 to 20 carbon atoms, R represents a branched or linear-chain alkyl group having 1 to 20 carbon atoms or a cycloalkyl group having 6 to 20 carbon atoms optionally having a substituent, and u represents an integer of 0 to 3), and a carbonate unit (a-3) derived from 2,2-bis(4-hydroxyphenyl)propane, wherein
1) a molar ratio of the carbonate unit (a-1) to the carbonate unit (a-2) is from 50/50 to 80/20, and
2) a molar ratio of the total of the carbonate unit (a-1) and the carbonate unit (a-2) to the carbonate unit (a-3) is from 1:99 to 70:30. This polycarbonate resin composition or copolymer has excellent heat resistance, transparency, and bending resistance and has low retardation.

1 Claim, No Drawings

(56) References Cited

FOREIGN PATENT DOCUMENTS

| | | |
|---|---|---|
| JP | 2010-77249 | 4/2010 |
| JP | 2011-252060 | 12/2011 |
| JP | 2013-164501 | 8/2013 |
| JP | 2017-95605 | 6/2017 |
| WO | 00/026705 | 5/2000 |
| WO | 01/009649 | 2/2001 |
| WO | 2008/156186 | 12/2008 |
| WO | 2014/208423 | 12/2014 |
| WO | 2017/010318 | 1/2017 |
| WO | 2017/073508 | 5/2017 |

* cited by examiner

POLYCARBONATE RESIN COMPOSITION OR COPOLYMER, AND OPTICAL FILM

TECHNICAL FIELD

The present invention relates to a polycarbonate resin composition or copolymer and an optical film that have high heat resistance, excellent transparency and bending resistance, and low retardation.

BACKGROUND ART

Polycarbonate resins (hereinafter, referred to as PC-A) each obtained by reacting 2,2-bis(4-hydroxyphenyl)propane (hereinafter, referred to as bisphenol A) with a carbonate precursor have been conventionally used as engineering plastic in a wide variety of fields because of their excellent transparency, heat resistance, mechanical properties, and dimensional stability. In recent years, by use of their transparency, application of polycarbonate resins as optical materials in the fields of optical disks, films, lenses, and the like has been further deployed.

Polycarbonate resins, however, are materials that have a higher photoelastic coefficient and in which retardation is more likely to occur by stress in comparison with acrylic resins and cyclic olefin resins. Thus, in the case where polycarbonate resins are used in substrates for transparent electroconductive films and display front plates, there has been a problem in that rainbow unevenness is observed when viewed with polarized sunglasses. Head-up display devices, which have begun to be mounted on automobiles recently, require a dustproof cover in order to prevent dust and dirt from entering the projection port, which projects images from the device body on the projection part of glass or the like. In the case of using a cover made of a polycarbonate resin, if the cover itself has a high retardation, distortion may occur in projected images. Thus, it is necessary to reduce the retardation.

Then, as countermeasures to the above problems, various approaches have been contemplated. As one of them, it has been suggested that copolymers of bisphenol A and 9,9-bis(4-hydroxy-3-methylphenyl)fluorene polycarbonate can achieve high heat resistance (PTLs 1 and 2).

There have been suggested use of films obtained by using a polycarbonate resin made of the 9,9-bis(4-hydroxy-3-methylphenyl)fluorene for retardation films or protective films for polarizing plates (PTLs 3, 4, 5, and 6) and film formation of a polycarbonate resin made of 9,9-bis[4-(2-hydroxyethoxy)phenyl]fluorene as one having a fluorene structure and a spiroglycol by a melt film forming method (PTL 7).

However, melt film formation of the above polycarbonate resin made of 9,9-bis[4-(2-hydroxyethoxy)phenyl]fluorene and a spiroglycol is difficult because of its low thermal decomposition temperature, and there is a problem in that decomposition occurs during film formation to generate air bubbles or gelling. In addition, the films have low strength, and have a problem in the bending property. As described in PTL 8, a copolymerized polycarbonate resin of 9,9-bis(4-hydroxy-3-methylphenyl)fluorene and 3,9-bis(2-hydroxy-1,1-dimethylethyl)-2,4,8,10-tetraoxaspiro(5.5)undecane has been suggested as a low-retardation and high-refractive-index material for camera lenses of mobile phones. However, when the resin was formed into a film, it was difficult to use the film because the film was too brittle.

So far, there has been no report on optical films of a mixture of a polycarbonate resin having a fluorene structure and bisphenol A polycarbonate, the films having low retardation as well as excellent heat resistance, transparency, and bending resistance.

CITATION LIST

Patent Literature

[PTL 1] Japanese Unexamined Patent Application Publication No. 2004-331688
[PTL 2] Japanese Unexamined Patent Application Publication No. 8-134199
[PTL 3] International Publication No. WO 2000/026705
[PTL 4] International Publication No. WO 01/009649
[PTL 5] Japanese Unexamined Patent Application Publication No. 2001-296423
[PTL 6] Japanese Unexamined Patent Application Publication No. 2001-194530
[PTL 7] International Publication No. WO 2008/156186
[PTL 8] International Publication No. WO 2017/010318

SUMMARY OF INVENTION

Technical Problem

It is an object of the present invention to provide a polycarbonate resin composition or copolymer and an optical member, particularly an optical film, formed therefrom, which have excellent transparency and bending resistance and have low retardation.

Solution to Problem

The present inventors have extensively studied and, as a result, have revealed that complete compatibility (a single glass transition temperature) can be achieved by preparing a polycarbonate resin composition or copolymer containing carbonate units each derived from a monomer raw materials each containing a diol having a fluorene ring in a side chain, a specific spirocyclic structure, and 2,2-bis(4-hydroxyphenyl)propane at a specific ratio, particularly a composition obtained by blending a copolymerized polycarbonate resin containing a diol having a fluorene ring in a side chain and a monomer having a specific spirocyclic structure at a specific ratio and a 2,2-bis(4-hydroxyphenyl)propane-polycarbonate resin (hereinafter, may be abbreviated as the PC-A resin), and have found that the above object is achieved.

That is, according to the invention, the following constitutions are provided.

1. A polycarbonate resin composition or a copolymer, comprising, as main repeating units, a carbonate unit (a-1) having a fluorene ring in a side chain, a carbonate unit (a-2) represented by the following formula (a-2):

[Chem. 1]

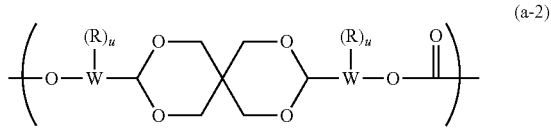

(wherein W represents an alkylene group having 1 to 20 carbon atoms or a cycloalkylene group having 6 to 20 carbon atoms, R represents a branched or linear-chain alkyl group having 1 to 20 carbon atoms or a cycloalkyl group having 6 to 20 carbon atoms optionally having a substituent, and u represents an integer of 0 to 3), and a carbonate unit (a-3) derived from 2,2-bis(4-hydroxyphenyl)propane, wherein 1) a molar ratio of the carbonate unit (a-1) to the carbonate unit (a-2) is from 50/50 to 80/20, and 2) a molar ratio of the total of the carbonate unit (a-1) and the carbonate unit (a-2) to the carbonate unit (a-3) is from 1:99 to 70:30.

2. A polycarbonate resin composition comprising a copolymerized polycarbonate resin (A) containing, as main repeating units, a carbonate unit (a-1) having a fluorene ring in a side chain and a carbonate unit (a-2) represented by the following formula (a-2):

[Chem. 2]

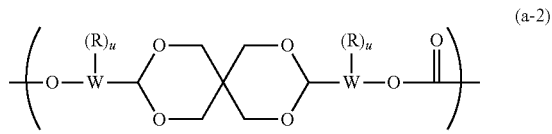

(a-2)

(wherein W represents an alkylene group having 1 to 20 carbon atoms or a cycloalkylene group having 6 to 20 carbon atoms, R represents a branched or linear-chain alkyl group having 1 to 20 carbon atoms or a cycloalkyl group having 6 to 20 carbon atoms optionally having a substituent, and u represents an integer of 0 to 3), and a polycarbonate resin (B) containing, as a main repeating unit, 2,2-bis(4-hydroxyphenyl)propane, wherein 1) a molar ratio of the carbonate unit (a-1) to the carbonate unit (a-2) in the polycarbonate resin (A) is from 50/50 to 80/20, and 2) a weight ratio of the polycarbonate resin (A) to the polycarbonate resin (B) is from 1:99 to 70:30.

3. The polycarbonate resin composition or copolymer according to statement 1 or 2, wherein the carbonate unit (a-1) is a unit represented by the following formula (a-1-1)

[Chem. 3]

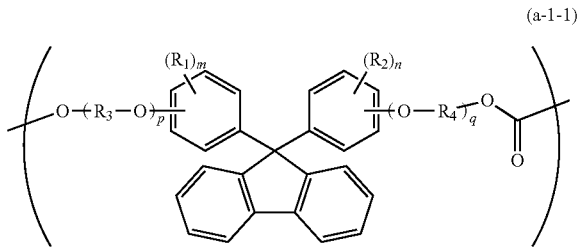

(a-1-1)

(wherein $R_1$ and $R_2$ each independently represent a hydrogen atom, a hydrocarbon group having 1 to 10 carbon atoms optionally containing an aromatic group, or a halogen atom, $R_3$ and $R_4$ each independently represent a hydrocarbon group having 1 to 10 carbon atoms optionally containing an aromatic group, m and n each independently represent an integer of 0 to 4, and p and q each independently represent an integer of 0 or more).

4. The polycarbonate resin composition or copolymer according to any of statements 1 to 3, wherein the carbonate unit (a-1) is a unit derived from 9,9-bis[4-(2-hydroxyethoxy)phenyl]fluorene or 9,9-bis(4-hydroxy-3-methylphenyl)fluorene.

5. The polycarbonate resin composition or copolymer according to any of statements 1 to 4, wherein the carbonate unit (a-2) is a unit derived from 3,9-bis(2-hydroxy-1,1-dimethylethyl)-2,4,8,10-tetraoxaspiro(5.5)undecane.

6. The polycarbonate resin composition or copolymer according to any of statements 1 to 5, wherein the compound has a single glass transition temperature, and the temperature is in the range of from 130° C. to 150° C.

7. An optical film comprising the polycarbonate resin composition or copolymer according to any of statements 1 to 6.

8. The optical film according to statement 7, wherein the optical film has a thickness of from 20 to 500 μm.

9. The optical film according to statement 7 or 8, wherein the optical film has an in-plane retardation of 100 nm or less.

10. The optical film according to any of statements 7 to 9, wherein the optical film has a haze value of 5% or less.

11. An optical member using an optical film composed of the polycarbonate resin composition or copolymer according to any of statements 1 to 6 is used.

12. A liquid crystal display device or organic EL display device using the optical film according to any of statements 7 to 10 is used.

13. A head-up display device using the optical film according to any of statements 7 to 10.

Advantageous Effects of Invention

The polycarbonate resin composition or copolymer of the present invention is a polycarbonate resin composition or copolymer containing carbonate units at a specific ratio, wherein the carbonate units are derived from corresponding monomer raw materials respectively containing a diol having a fluorene structure, a diol having a specific spirocyclic structure, and 2,2-bis(4-hydroxyphenyl)propane, and an optical film formed therefrom. Having excellent heat resistance, transparency, and bending resistance and having low retardation, the polycarbonate resin composition or copolymer, and the optical film formed therefrom are significantly useful as optical films for liquid crystal display devices, organic EL display devices, head-up display devices, and the like, and thus, the industrial effects exerted thereby are exceptional.

DESCRIPTION OF EMBODIMENT

The invention will be described in detail hereinafter.
<Polycarbonate Resin Composition or Copolymer>

The polycarbonate resin composition or copolymer of the present invention is a polycarbonate resin composition or copolymer comprising, as main repeating units, a carbonate unit (a-1) having a fluorene ring in a side chain, a carbonate unit (a-2) having a spirocyclic structure represented by the above formula (a-2), and a carbonate unit (a-3) derived from 2,2-bis(4-hydroxyphenyl)propane, wherein 1) the molar ratio of the carbonate unit (a-1) to the carbonate unit (a-2) is from 50/50 to 80/20, and 2) the molar ratio of the total of the carbonate unit (a-1) and the carbonate unit (a-2) to the carbonate unit (a-3) is from 1:99 to 70:30.

The molar ratio of the carbonate unit (a-1) to the carbonate unit (a-2) is from 50/50 to 80/20 and preferably from 50/50 to 75/25. When the molar ratio is in the above range, a polycarbonate resin composition or copolymer having an excellent balance between the heat resistance and the retardation can be obtained.

The molar ratio of the total of the carbonate unit (a-1) and carbonate unit (a-2) to the carbonate unit (a-3) is from 1:99 to 70:30, preferably in the range of from 10:90 to 50:50, and more preferably in the range of from 20:80 to 40:60. When the molar ratio is in the above range, a polycarbonate resin composition or copolymer having heat resistance, transparency, and low retardation can be obtained.

Particularly, preferably used is a polycarbonate resin composition, containing a copolymerized polycarbonate resin (A) comprising, as main repeating units, a carbonate unit (a-1) having a fluorene ring in a side chain and a carbonate unit (a-2) having a spirocyclic structure represented by the above formula (a-2), and a polycarbonate resin (B) comprising, as a main repeating unit, 2,2-bis(4-hydroxyphenyl)propane, wherein
1) the molar ratio of the carbonate unit (a-1) to the carbonate unit (a-2) in the polycarbonate resin (A) is from 50/50 to 80/20, and
2) the weight ratio of the polycarbonate resin (A) to the polycarbonate resin (B) is from 1:99 to 70:30.

<Copolymerized Polycarbonate Resin (A)>

The copolymerized polycarbonate resin (A) in the present invention is a copolymerized polycarbonate resin (A) comprising, as main repeating units, a carbonate unit (a-1) having a fluorene ring in a side chain and a carbonate unit (a-2) represented by the above formula (a-2).

Here, "main" indicates that the total of the carbonate unit (a-1) and carbonate unit (a-2) is 70 mol % or more, more preferably 75 mol % or more, and sill more preferably 80 mol % or more on the basis of the entire carbonate units.

(Carbonate Unit (a-1))

The carbonate unit (a-1) is a carbonate unit (a-1) that is a polycarbonate resin having a fluorene ring in a side chain.

An example of a preferable structure of the carbonate unit (a-1) preferably includes the following (a-1-1) or (a-1-2). A more preferable structure includes the following (a-1-1), further a preferable structure of (a-1-1) includes the following (a-1-1-a) or (a-1-1-b), and a particularly preferable structure includes the following (a-1-1-a1) or (a-1-1-b1).

The carbonate unit (a-1-1) is represented by the following formula.

[Chem. 4]

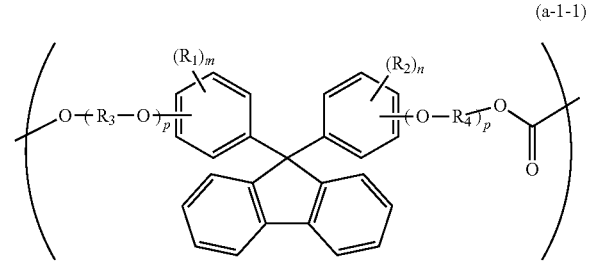

(a-1-1)

In the carbonate unit (a-1-1), $R_1$ and $R_2$ each independently represent a hydrogen atom, a hydrocarbon group having 1 to 10 carbon atoms optionally containing an aromatic group, or a halogen atom. Preferable examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms, and alkenyl groups having 1 to 10 carbon atoms. $R_3$ and $R_4$ each independently represent a hydrocarbon group having 1 to 10 carbon atoms optionally containing an aromatic group. The hydrocarbon group is preferably an alkylene group having 1 to 10 carbon atoms, more preferably an alkylene group having 1 to 4 carbon atoms, and still more preferably an ethylene group. m and n each independently represent an integer of 0 to 4, and p and q are each independently an integer of 0 or more, preferably an integer of 0 to 20, more preferably an integer of 0 to 12, still more preferably an integer of 0 to 8, particularly preferably an integer of 0 to 4, and most preferably 0 and 1.

When p and q are 0, the carbonate unit (a-1-1) is represented by the following formula (a-1-1-a).

[Chem. 5]

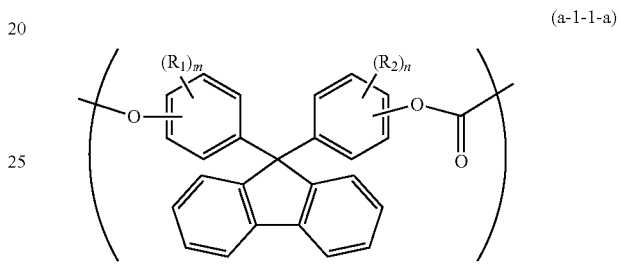

(a-1-1-a)

$R_1$ and $R_2$ in the above formula each independently represent a hydrogen atom, a hydrocarbon group having 1 to 10 carbon atoms optionally containing an aromatic group, or a halogen atom.

Preferable examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms, and alkenyl groups having 1 to 10 carbon atoms. $R_3$ and $R_4$ each independently represent a hydrocarbon group having 1 to 10 carbon atoms optionally containing an aromatic group. The hydrocarbon group is preferably an alkylene group having 1 to 10 carbon atoms, more preferably an alkylene group having 1 to 4 carbon atoms, and still more preferably an ethylene group. m and n each independently represent an integer of 0 to 4.

Examples of specific compounds of the unit (a-1-1-a) preferably include units derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-propylphenyl)fluorene, 9,9-bis(4-hydroxy-3-cyclohexylphenyl)fluorene, 9,9-bis(4-hydroxy-3-phenylphenyl)fluorene, and the like. Compounds from which these units (a-1-1-a) are derived can be used alone or can be used in combinations of two or more thereof.

Among these, 9,9-bis(4-hydroxyphenyl)fluorene and 9,9-bis(4-hydroxy-3-methylphenyl)fluorene are more preferable, and the unit (a-1-1-a1) represented by the following formula, derived from 9,9-bis(4-hydroxy-3-methylphenyl)fluorene, is particularly preferable.

[Chem. 6]

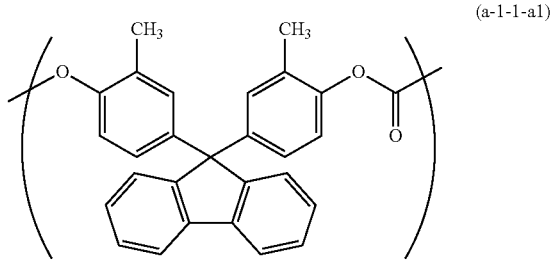

(a-1-1-a1)

When p and q each are an integer of 1 or more, the carbonate unit (a-1-1) is represented by the following formula (a-1-1-b).

[Chem. 7]

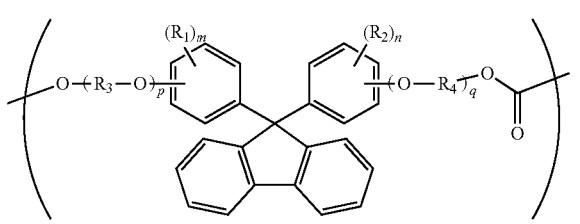

(a-1-1-b)

In the carbonate unit (a-1-1-b), $R_1$ and $R_2$ each independently represent a hydrogen atom, a hydrocarbon group having 1 to 10 carbon atoms optionally containing an aromatic group, or a halogen atom.

Preferable examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms, and alkenyl groups having 1 to 10 carbon atoms. $R_3$ and $R_4$ each independently represent a hydrocarbon group having 1 to 10 carbon atoms optionally containing an aromatic group. The hydrocarbon group is preferably an alkylene group having 1 to 10 carbon atoms, more preferably an alkylene group having 1 to 4 carbon atoms, and still more preferably an ethylene group. m and n each independently represent an integer of 0 to 4.

Examples of specific compounds of the carbonate unit (a-1-1-b) preferably include 9,9-bis[4-(2-hydroxyethoxy)phenyl]fluorene, 9,9-bis[4-(3-hydroxypropoxy)phenyl]fluorene, 9,9-bis[4-(4-hydroxybutoxy)phenyl]fluorene, 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(2-hydroxyethoxy)-3-propenylphenyl]fluorene, 9,9-bis[4-(2-hydroxyethoxy)-3-fluorophenyl]fluorene, and units derived from these 9,9-bis(hydroxyalkoxyphenyl)fluorenes. Additionally, examples thereof more preferably include units derived from 9,9-bis[hydroxypoly(alkyleneoxy)phenyl]fluorenes and the like, wherein p and q are 2 or more.

Among these, 9,9-bis[4-(2-hydroxyethoxy)phenyl]fluorene, 9,9-bis[4-(2-hydroxyethoxy)-3-methylphenyl]fluorene, and the like are particularly preferable.

Particularly, the following formula (a-1-1-b1)

[Chem. 8]

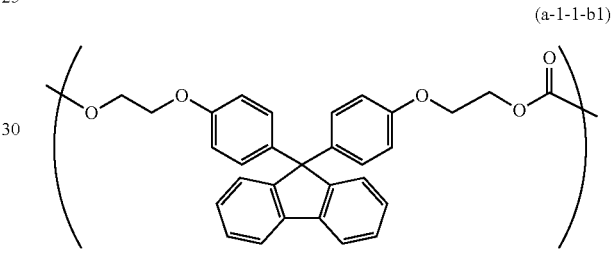

(a-1-1-b1)

The preferable carbonate unit (a-1-2) is represented by the following formula.

[Chem. 9]

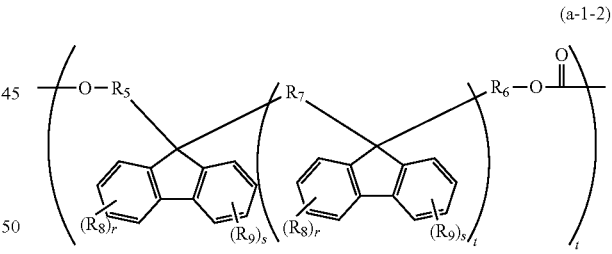

(a-1-2)

[wherein $R_5$ and $R_6$ are each independently a direct bond, an optionally-substituted alkylene group having 1 to 10 carbon atoms, an optionally-substituted arylene group having 4 to 10 carbon atoms, or an optionally-substituted aralkylene group having 6 to 10 carbon atoms, or a group formed by bonding at least two groups selected from the group consisting of an optionally-substituted alkylene group having from 1 to 10 carbon atoms, an optionally-substituted arylene group having from 4 to 10 carbon atoms, and an optionally-substituted aralkylene group having from 6 to 10 carbon atoms, via an oxygen atom, an optionally-substituted sulfur atom, an optionally-substituted nitrogen atom, or a carbonyl group, $R_7$ is a direct bond, an optionally-substituted alkylene group having 1 to 10 carbon atoms, an optionally-substituted arylene group having 4 to 10 carbon atoms, or an optionally-substituted aralkylene group having 6 to 10 carbon atoms, and $R_8$ to $R_9$ are each independently a hydrogen atom, an optionally-substituted alkyl group having 1 to 10 carbon atoms, an optionally-substituted aryl group having 4 to 10 carbon atoms, an optionally-substituted acyl group having 1 to 10 carbon atoms, an optionally-substituted alkoxy group having 1 to 10 carbon atoms, an optionally-substituted aryloxy group having 1 to 10 carbon atoms, an optionally-substituted amino group, a sulfur atom having a substituent, a halogen atom, a nitro group, or a cyano group. r and s each independently represent an integer of 0 to 4, and t represents an integer value of 1 to 5.]

Examples of specific compounds from which the above general formula (a-1-2) is derived preferably include 9,9'-di(hydroxymethyl)-9,9'-bifluorenyl, bis(9-hydroxymethyl-fluoren-9-yl)methane, 1,2-bis(9-hydroxymethylfluoren-9-yl)ethane, bis[9-(3-hydroxypropyl)-fluoren-9-yl]methane, bis{9-[2-(2-hydroxyethoxy)carbonylethyl]fluoren-9-yl}methane, 9,9-bis[(9-hydroxymethylfluoren-9-yl)-methyl]fluorene, 1,2-bis[9-(3-hydroxypropyl)-fluoren-9-yl]ethane, α,α-bis-(9-hydroxymethylfluoren-9-yl)-1,4-xylene, 1,2-bis(9-hydroxymethylfluoren-9-yl)butane, 1-bis(9-hydroxymethylfluoren-9-yl)ethane, 1,2-bis(9-hydroxyfluoren-9-yl)ethane, and bis-{[4-(2-hydroxyethoxy)phenyl]fluoren-9-yl}ethane.

(Carbonate Unit (a-2))

The carbonate unit (a-2) in the present invention, as shown in the above formula (a-2), is derived from a diol having a spirocyclic structure. Examples of the diol compound having a spirocyclic structure include alicyclic diol compounds such as 3,9-bis(2-hydroxyethyl)-2,4,8,10-tetraoxaspiro(5.5)undecane, 3,9-bis(2-hydroxy-1,1-dimethylethyl)-2,4,8,10-tetraoxaspiro(5.5)undecane, 3,9-bis(2-hydroxy-1,1-diethylethyl)-2,4,8,10-tetraoxaspiro(5.5)undecane, and 3,9-bis(2-hydroxy-1,1-dipropylethyl)-2,4,8,10-tetraoxaspiro(5.5)undecane.

Preferably, 3,9-bis(2-hydroxy-1,1-dimethylethyl)-2,4,8,10-tetraoxaspiro(5.5)undecane (a-2-1) represented by the following formula is used.

[Chem. 10]

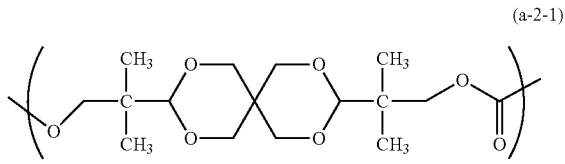

(a-2-1)

(Composition)

The copolymerized polycarbonate resin (A) in the present invention includes, as main repeating units, a carbonate unit (a-1) and a carbonate unit (a-2), and the molar ratio of (a-1) to (a-2) is from 50/50 to 80/20 and preferably from 50/50 to 75/25. When the molar ratio is in the above range, the copolymerized polycarbonate resin (A) has an excellent balance among compatibility with the above polycarbonate resin (B), heat resistance, retardation, and the like.

As other carbonate units, a ternary composition including bisphenol A, 2,2-bis(4-hydroxy-3-methylphenyl)propane (hereinafter, Bis-C), and 1,1-bis(4-hydroxyphenyl)-3,3,5-trimethylcyclohexane (hereinafter, BisTMC), or the like may be used.

When the molar ratio of the carbonate unit (a-1) of the polycarbonate resin (A) in the present invention is lower than the lower limit, the heat resistance is poor. On the other hand, when the molar ratio is higher than the upper limit, the resin (A) becomes brittle. The mol fraction can be calculated by measuring with proton NMR.

(Method for Producing Copolymerized Polycarbonate Resin (A))

The copolymerized polycarbonate resin (A) in the present invention is produced by a reaction means known per se for producing an ordinary polycarbonate resin, for example, a method for subjecting a diol component to a reaction with a carbonate precursor such as a carbonic acid diester. Next, a basic means for such production methods will be briefly described.

A transesterification reaction using a carbonic acid diester as a carbonate precursor is carried out by a method in which a diol component at a predetermined proportion is stirred with a carbonic acid diester while being heated under an inert gas atmosphere and an alcohol or phenol to be produced is distilled out. The reaction temperature, which depends on the boiling point of the alcohol or phenol to be produced, is generally from 120 to 300° C. The reaction is proceeded while the alcohol or phenol to be produced is distilled off under reduced pressure from an initial stage of the reaction so as to complete the reaction. An end terminator, an antioxidant, and the like may also be added as required.

Examples of the carbonic acid diester to be used for the transesterification include esters of an aryl group, an aralkyl group, and the like each optionally substituted and having 6 to 12 carbon atoms. Specific examples thereof include diphenyl carbonate, ditolyl carbonate, bis(chlorophenyl)carbonate, and m-cresyl carbonate. Among them, diphenyl carbonate is particularly preferable. The amount of diphenyl carbonate to be used is preferably from 0.97 to 1.10 mol and more preferably 1.00 to 1.06 mol based on the total of 1 mol of the dihydroxy compound.

In addition, in a melt-polymerization method, a polymerization catalyst may be used to accelerate the polymerization rate. Examples of such a polymerization catalyst include alkali metal compounds, alkaline earth metal compounds, nitrogen-containing compounds, and metal compounds.

As such compounds, organic acid salts, inorganic salts, oxides, hydroxides, hydrides, alkoxides, quaternary ammonium hydroxides, and the like of alkali metals and alkaline earth metals are preferably used. These compounds may be used singly or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt, and dilithium salt of bisphenol A, and sodium salt, potassium salt, cesium salt, and lithium salt of phenol.

Examples of the alkaline earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, barium diacetate, and barium stearate.

Examples of the nitrogen-containing compound include quaternary ammonium hydroxides having an alkyl, aryl group, or the like, such as tetramethylammonium hydroxide, tetraethylammonium hydroxide, tetrapropylammonium hydroxide, tetrabutylammonium hydroxide, and trimethylbenzylammonium hydroxide. Examples also include tertiary amines, such as triethylamine, dimethylbenzylamine, and triphenylamine, and imidazoles, such as 2-methylimidazole, 2-phenylimidazole, and benzimidazole. Examples also include bases and basic salts such as ammonia, tetramethylammonium borohydride, tetrabutylammonium borohydride, tetrabutylammonium tetraphenylborate, and tetraphenylammonium tetraphenylborate.

Examples of the metal compound include zinc aluminum compounds, germanium compounds, organotin compounds, antimony compounds, manganese compounds, titanium compounds, and zirconium compounds. One of these compounds may be used singly or two or more of these may be used in combination.

The amount of the polymerization catalyst used is selected from the range of preferably from $1 \times 10^{-9}$ to $1 \times 10^{-2}$ equivalents, preferably from $1 \times 10^{-8}$ to $1 \times 10^{-5}$ equivalents, and more preferably from $1 \times 10^{-7}$ to $1 \times 10^{-3}$ equivalents per 1 mol of the diol component.

In addition, it is also possible to add a catalyst deactivator in the late stage of the reaction. As the catalyst deactivator to be used, known catalyst deactivators are effectively used. Among them, an ammonium salt or phosphonium salt of sulfonic acid is preferred. Further, salts of dodecylbenzenesulfonic acid, such as tetrabutylphosphonium dodecylbenzenesulfonate, and salts of p-toluenesulfonic acid, such as tetrabutylammonium p-toluenesulfonate, are preferred.

In addition, as esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, and the like are preferably used. Among them, tetrabutylphosphonium dodecylbenzenesulfonate is most preferably used.

When at least one polymerization catalyst selected from the alkali metal compounds and/or alkaline earth metal compounds is used, the use amount of the catalyst deactivator is preferably from 0.5 to 50 mol per mole of the metal element included in the catalyst, more preferably from 0.5 to 10 mol, and still more preferably from 0.8 to 5 mol.

<Polycarbonate Resin (B)>

The polycarbonate resin (B) in the present invention is a polycarbonate including, as a main repeating unit, 2,2-bis(4-hydroxyphenyl)propane (bisphenol A).

Here, "main" indicates that the carbonate having bisphenol A is 70 mol % or more, more preferably 75 mol % or more, and still more preferably 80 mol % or more on the basis of the entire carbonate units.

(Specific viscosity: $\eta_{SP}$)

The specific viscosity ($\eta_{SP}$) of each of the copolymerized polycarbonate resin (A) and the polycarbonate resin (B) is preferably within the range of from 0.2 to 1.5. When the specific viscosity is within a range of from 0.2 to 1.5, molded articles such as films will have good strength and molding workability. The specific viscosity is more preferably from 0.20 to 1.2, still more preferably from 0.20 to 1.0, and particularly preferably from 0.20 to 0.5.

The specific viscosity referred to in the present invention is determined from a solution prepared by dissolving 0.7 g of the polycarbonate resin in 100 ml of methylene chloride at 20° C. by using an Ostwald viscometer.

Specific Viscosity $(\eta_{SP})=(t-t_0)/t_0$

[$t_0$ is outflow time (in second) of methylene chloride, and t is outflow time (in second) of a sample solution]

Incidentally, the concrete measurement of the specific viscosity can be carried out, for example, as follows. The polycarbonate resin is first dissolved in methylene chloride in an amount of 20 to 30 times the weight of the resin, and a soluble content is collected by Celite filtration. Then, the solvent is removed and dried completely to obtain the solid soluble in methylene chloride. The specific viscosity at 20° C. of a solution prepared by dissolving 0.7 g of the solid in 100 ml of methylene chloride is determined by using an Ostwald viscometer.

(Method for Producing Polycarbonate Resin Composition Containing Copolymerized Polycarbonate Resin (A) and Polycarbonate Resin (B))

For the resin composition of the present invention, the copolymerized polycarbonate resin (A) and the polycarbonate resin (B) are preferably blended in a molten state. In a method of blending in a molten state, an extruder is generally used. At a molten resin temperature of from 200 to 320° C., preferably from 220 to 300° C., and more preferably from 230 to 290° C., the resins are kneaded and pelletized. This can provide pellets of the resin composition in which both of the resins are blended homogeneously. The configuration of the extruder, the configuration of the screw(s), and the like are not particularly limited. When the molten resin temperature in the extruder exceeds 320° C., the resin may be colored or thermally decomposed. In contrast, when the resin temperature falls below the lower limit, the resin viscosity is extremely high, and the extruder may become overloaded.

(Composition Ratio of Copolymerized Polycarbonate Resin (A) to Polycarbonate Resin (B))

The weight ratio of the copolymerized polycarbonate resin (A) to the PC-A resin (B) described above is in the range of from 1:99 to 70:30. The weight ratio is preferably in the range of from 10:90 to 50:50 (weight ratio) and more preferably in the range of from 20:80 to 40:60 (weight ratio). When the weight ratio is in the above range, a polycarbonate resin composition having heat resistance, transparency, and low retardation can be obtained. When the weight ratio of the copolymerized polycarbonate resin component exceeds the upper limit, the composition becomes easy to crack, which will be a problem.

(Glass Transition Temperature: Tg)

The polycarbonate resin composition of the present invention preferably has a single glass transition temperature (Tg). The glass transition temperature (Tg) is from 130 to 150° C. and more preferably from 135 to 145° C. When Tg is in the above range, the heat resistance and moldability are satisfactory, which is preferable.

The glass transition temperature (Tg) is measured by using a model 2910 DSC manufactured by TA Instruments Japan Inc. at a temperature rise rate of 20° C./min. In the present invention, the composition having a single glass transition temperature (Tg) means that only one inflection point, which represents the glass transition temperature, appears when the glass transition temperature is measured in compliance with JIS K 7121 at a heating rate of 20° C./minute using a differential scanning calorimeter (DSC).

Generally, a polymer blend composition having a single glass transition temperature means that the resins to be mixed are in a compatible state on the order of nanometer (molecular level). This composition can be regarded as a compatible system.

(Additives)

The polycarbonate resin composition of the present invention may contain additives known per se, in accordance with the application or as required, such as a heat stabilizer, a plasticizer, a light stabilizer, a polymerization metal deactivator, a flame retardant, a lubricant, an antistatic agent, a surfactant, an antimicrobial, an ultraviolet absorber, a release agent, a colorant, an impact modifier, and the like.

(Molded Article)

The polycarbonate resin composition of the present invention is molded and processed by any method such as an injection molding method, a compression molding method, an injection compression molding method, a melt film forming method, and a casting method, and then, can be used as molded articles such as optical lenses, optical disks, optical films, plastic cell substrates, optical cards, liquid crystal panels, head lamp lenses, light guide plates, diffusion plates, protective films, OPC binders, front boards, enclosures, trays, water tanks, lighting covers, signboards, and resin windows. Particularly, films formed from the resin composition of the present invention can be used as retardation films or protective films for liquid crystal display devices, organic EL displays, and the like.

(Method for Producing Film)

The polycarbonate resin composition of the present invention is suitably used in film applications. Examples of the method for producing such a film include known methods such as solution casting, melt extrusion, hot press, and calendering methods. As the method for producing a film of the present invention, the melt extrusion method is preferred from the viewpoint of productivity.

In the melt extrusion method, preferably used is a method in which the resin is extruded using a T die and the extruded resin is supplied to a cooling roll. The temperature at this point is determined from the molecular weight, Tg, melt flowability, and the like of the resin composition, and is preferably in the range of from 180 to 350° C. and more preferably in the range of from 200 to 320° C. When the temperature is lower than the lower limit, the viscosity increases, whereby the orientation and stress strain of the polymer are likely to remain. In contrast, when the temperature is higher than the upper limit, problems such as thermal deterioration, coloration, and a die line (streak) from the T die are likely to occur.

Since the polycarbonate resin used in the present invention has good solubility in an organic solvent, the solution casting method can also be employed. In the case of the solution casting method, methylene chloride, 1,2-dichloroethane, 1,1,2,2-tetrachloroethane, dioxolane, dioxane, or the like is preferably used as the solvent. The amount of the residual solvent in the film obtained by the solution casting method is preferably 2% by weight or less and more preferably 1% by weight or less. When the amount exceeds 2% by weight, that is, when the amount of the residual solvent is large, the glass transition temperature of the film markedly drops, which is not preferred from the viewpoint of heat resistance.

(Retardation)

An optical film obtained by using the polycarbonate resin composition used in the present invention has R(550), an in-plane retardation value of the film at a wavelength of 550 nm, which is given by preferably R(550)≤100 nm and more preferably R(550)≤30 nm.

The retardation value R, defined by the following expression, is a property indicating a phase delay between the X direction and the Y direction perpendicular to the X direction of the light transmitting the film in a normal direction.

$$R=(nx-ny) \times d \times 10^3$$

Wherein nx is an in-plane refractive index of the film in the slow axis direction, ny is an in-plane refractive index of the film in the direction perpendicular to that of nx, and d is a thickness of the film (expressed in μm).

The retardation and the wavelength dispersibility of the optical film are measured using KOBRA-WFD manufactured by Oji Scientific Instruments.

(Birefringence)

The optical film obtained by using the polycarbonate resin composition used in the present invention has an in-plane birefringence (Δn) at a wavelength of 550 nm: preferably $\Delta n \times 10^3 \leq 0.2$ and more preferably $\Delta n \times 10^3 \leq 0.1$.

(Thickness)

The optical film obtained from the polycarbonate resin composition of the present invention has a thickness of preferably from 20 to 500 μm, more preferably from 60 to 300 μm, and still more preferably from 100 to 300 μm. When the thickness exceeds the upper limit, in the display application there are likely to occur problems: thickening of polarizing plates, which are deeply desired to be thinner, and light leakage causing color unevenness due to occurrence of strain, that is, change in retardation during application of heat. When the thickness is less than the lower limit, it is not possible to satisfy necessary retardation.

(Haze)

The haze value of a film in the present invention is preferably 5% or less, more preferably 2% or less, and still more preferably 1% or less at a thickness of 300 μm. When a haze value is within the above range the visibility is excellent, which is preferable.

(Surface Treatment)

Films to be formed from the polycarbonate resin composition of the present invention can be subjected to various surface treatments. The surface treatments referred to herein are treatments to form a new layer on the surface layer of a resin molded article, such as deposition (e.g., physical vapor deposition and chemical vapor deposition), plating (e.g., electroplating, electroless plating, and hot-dip plating), painting, coating, and printing, and methods commonly used are applicable. Specific examples of the surface treatment include various surface treatments such as hard coating, water-repellent/oil-repellent coating, UV absorbing coating, IR absorbing coating, and metallizing (e.g., vapor deposition). Hard coating is a particularly preferred and required surface treatment.

EXAMPLES

The present invention will be described in more detail hereinafter with reference to examples below, but the present invention is not limited thereto. "Parts" in examples means "parts by weight". Resins and evaluation methods used in Examples are as follows.

1. Composition Ratio of Copolymerized Polycarbonate Resin (NMR)

Each repeating unit was measured using proton NMR of JNM-ECZ400S/L1 manufactured by JEOL Ltd. to calculate the composition ratio of a copolymerized polycarbonate resin (molar ratio).

2. Glass Transition Temperature (Tg) of Blend of Copolymerized Polycarbonate Resin (A) and Polycarbonate Resin (B)

Eight milligrams of a blend resin of a copolymerized polycarbonate resin (A) and a polycarbonate resin (B) were used to measure the glass transition temperature under nitrogen atmosphere (nitrogen flow rate: 40 ml/min) and under a condition of a temperature elevation rate of 20° C./min using a DSC-2910 thermal analyzing system manufactured by TA Instruments in compliance with JIS K7121.

3. Specific Viscosity ($\eta_{SP}$) of Copolymerized Polycarbonate Resin (A) and Polycarbonate Resin (B)

The specific viscosity ($\eta_{SP}$) was determined for the copolymerized polycarbonate resin (A) and the polycarbonate resin (B) from a solution prepared by dissolving 0.7 g of each of the polycarbonate resins in 100 ml of methylene chloride at 20° C. by using an Ostwald viscometer.

Specific Viscosity $(\eta_{SP})=(t-t_0)/t_0$

[$t_0$ is outflow time (in second) of methylene chloride, and t is outflow time (in second) of a sample solution]

4. Unstretched Film Thickness (d)

The thickness (d) (expressed in μm) of the center portion of an unstretched film obtained in each of Examples was measured with an electronic film thickness micrometer manufactured by Anritsu Corp.

5. Retardation (Re)

A specimen of 50 mm in length and 40 mm in width was cut out from the unstretched film obtained in each of Examples, and the in-plane retardation (Re) (expressed in nm) was measured using KOBRA-WFD manufactured by Oji Scientific Instruments.

6. Total Light Transmittance and Haze

The total light transmittance and haze of the blends of the copolymerized polycarbonate resin (A) and the polycarbonate resin (B) were measured in compliance with JIS K7136 using a spectral haze meter SH-7000 manufactured by Nippon Denshoku Kogyo Industries Co., Ltd.

7. Bendability

When the unstretched films obtained in Examples were bent once by hands, a film not cracked was evaluated as "Good", and a film cracked was evaluated as "Poor".

8. Birefringence

A specimen of 50 mm in length and 40 mm in width was cut out from the unstretched films obtained in each of Examples, the retardation R (550) was measured using KOBRA-WFD manufactured by Oji Scientific Instruments, and the birefringence index $\Delta n=R(550)/(d\times 10^3)$ was calculated. An average value of three measurements of the same sample was calculated.

[Copolymerized Polycarbonate Resin (A)]

Copolymerized PC1: structural unit derived from 9,9-bis[4-(2-hydroxyethoxy)phenyl]fluorene (hereinafter, abbreviated as BPEF)/structural unit derived from 3,9-bis(2-hydroxy-1,1-dimethylethyl)-2,4,8,10-tetraoxaspiro(5,5)undecane (hereinafter, abbreviated as SPG)=60/40 (mol %), specific viscosity ($\eta_{SP}$) 0.23 Copolymerized PC2: structural unit derived from BPEF/structural unit derived from SPG/structural unit derived from 1,1-bis(4-hydroxyphenyl)-3,3,5-trimethylcyclohexane (hereinafter, abbreviated as BisTMC)=52/24/24 (mol %), specific viscosity ($\eta_{SP}$) 0.23

Copolymerized PC3: structural unit derived from 9,9-bis(4-hydroxy-3-methylphenyl)fluorene (hereinafter, abbreviated as BCF)/structural unit derived from SPG=35/65 (mol %), specific viscosity ($\eta_{SP}$) 0.31

[Polycarbonate Resin (B)]

PC-A resin 1: bisphenol A polycarbonate resin, specific viscosity ($\eta_{SP}$) 0.34

PC-A resin 2: bisphenol A polycarbonate resin, specific viscosity ($\eta_{SP}$) 0.28

Example 1

<Production of Copolymerized PC1>

Under a nitrogen atmosphere, 105.24 parts of BPEF, 48.7 parts of SPG, 89.11 parts of diphenyl carbonate (hereinafter, abbreviated as DPC), and $1.68\times10^{-4}$ parts of sodium hydrogen carbonate as a catalyst were heated to 180° C. and melted. Thereafter, a transesterification reaction was carried out by reducing the pressure to 20 kPa over 20 minutes and simultaneously heating the jacket to 260° C. at a rate of 60° C./hr. With the jacket kept at 260° C., the pressure was reduced to 0.13 kPa over 80 minutes, and a polymerization reaction was carried out under conditions of 260° C. and 0.13 kPa or less for 30 minutes. After the reaction completed, the polycarbonate resin produced was extracted while pelletized to thereby obtain polycarbonate resin pellets. The composition ratio was measured by NMR. (Copolymerized PC1)

<Production of Resin Composition>

Using the copolymerized PC1 and PC-A resin 1, each of the resins was dried at 80° C. for 12 hours and then mixed at a weight ratio of 10:90. Thereafter, the mixture was melt-kneaded in a vented twin-screw extruder [KZW15-25MG manufactured by Technovel Corporation] with both the cylinder and the die set to 260° C. to obtain blend pellets of the copolymerized PC1 and PC-A resin 1. The Tg of the obtained pellets was measured with DSC.

<Production of Optical Film>

Subsequently, the pellets obtained were dried by a hot air circulation dryer at 90° C. for 12 hours. The pellets obtained were formed into a film at 260° C. on a 15 mmφ twin-screw extruder manufactured by Technovel Corporation, equipped with a T-die having a width of 150 mm and a lip width of 500 μm and a film take-up apparatus to obtain a transparent unstretched film. The thickness, retardation (Re, Rth), total light transmittance, haze, and bendability of this unstretched film were measured. The results are shown in Table 1.

Example 2

The operation was performed exactly in the same manner as in Example 1 except that the blend weight ratio was changed to copolymerized PC1/PC-A resin 1=20/80, and evaluation was made in the same manner as in Example 1. The results are shown in Table 1.

Example 3

The operation was performed exactly in the same manner as in Example 1 except that the blend weight ratio was changed to copolymerized PC1/PC-A resin 1=30/70, and evaluation was made in the same manner as in Example 1. The results are shown in Table 1.

Example 4

<Production of Copolymerized PC2>

Under a nitrogen atmosphere, 91.21 parts of BPEF, 29.22 parts of SPG, 29.80 parts of BisTMC, 89.11 parts of DPC, and $1.68\times10^{-4}$ parts of sodium hydrogen carbonate as a catalyst were heated to 180° C. and melted. Thereafter, a transesterification reaction was carried out by reducing the pressure to 20 kPa over 20 minutes and simultaneously heating the jacket to 260° C. at a rate of 60° C./hr. With the jacket kept at 260° C., the pressure was reduced to 0.13 kPa over 80 minutes, and a polymerization reaction was carried out under conditions of 260° C. and 0.13 kPa or less for 30 minutes. After the reaction completed, the polycarbonate resin produced was extracted while pelletized to thereby obtain polycarbonate resin pellets. The composition ratio was measured by NMR. (Copolymerized PC2)

The operation was performed exactly in the same manner as in Example 1 except that the blend weight ratio was changed to copolymerized PC2/PC-A resin 1=50/50, and evaluation was made in the same manner as in Example 1. The results are shown in Table 1.

Example 5

The operation was performed exactly in the same manner as in Example 4 except that the blend weight ratio was changed to copolymerized PC2/PC-A resin 1=70/30, and evaluation was made in the same manner as in Example 4. The results are shown in Table 1.

Example 6

The operation was performed exactly in the same manner as in Example 1 except that the blend weight ratio was changed to copolymerized PC1/PC-A resin 2=10/90, and evaluation was made in the same manner as in Example 1. The results are shown in Table 1.

Example 7

The operation was performed exactly in the same manner as in Example 1 except that the blend weight ratio was changed to copolymerized PC1/PC-A resin 2=20/80, and evaluation was made in the same manner as in Example 1. The results are shown in Table 1.

Example 8

The operation was performed exactly in the same manner as in Example 1 except that the blend weight ratio was changed to copolymerized PC1/PC-A resin 2=30/70, and evaluation was made in the same manner as in Example 1. The results are shown in Table 1.

Comparative Example 1

Under a nitrogen atmosphere, 51.41 parts of BCF, 80.26 parts of SPG, 89.29 parts of DPC, and $1.8\times10^{-2}$ parts of tetramethylammonium hydroxide and $1.6\times10^{-4}$ parts of sodium hydroxide as catalysts were heated to 180° C. and melted. Thereafter, the pressure was reduced and adjusted to 13.4 kPa over 30 minutes. Then, the temperature was raised to 260° C. at a rate of 20° C./hr and kept at that temperature for 10 minutes, and the pressure was reduced and adjusted to 133 Pa or less over 1 hour. A reaction was carried out under stirring for a total of 6 hours.

After the completion of the reaction, the mixture was discharged, under pressurized nitrogen gas, from the bottom of the reaction tank and cut with a pelletizer while cooled in a water tank to give pellets. The composition ratio was measured by NMR. (Copolymerized PC3)

The operation was performed to obtain an unstretched film exactly in the same manner as in Example 1 except that the blend pellets were obtained by extruding the blend which weight ratio was set to copolymerized PC3/PC-A resin 1=30/70. The film has no transparency and was clouded, and compatibility was not achieved. The results are shown in Table 2.

Comparative Example 2

The operation was performed exactly in the same manner as in Example 1 except that only the copolymerized PC1 was used without blending, and evaluation was made in the same manner as in Example 1. The results are shown in Table 2. The retardation was low, but the film was extremely brittle, and easily cracked when bent by hands.

Comparative Example 3

The operation was performed exactly in the same manner as in Example 1 except that only the copolymerized PC2 was used without blending, and evaluation was made in the same manner as in Example 1. The results are shown in Table 2. The retardation was low, but the film was extremely brittle, and easily cracked when bent by hands.

Comparative Example 4

The operation was performed exactly in the same manner as in Example 1 except that only the PC-A resin 1 was used without blending, and evaluation was made in the same manner as in Example 1. The results are shown in Table 2. The retardation Re and the birefringence (Δn) were higher than those of Examples.

TABLE 1

| | | Example 1 | Example 2 | Example 3 | Example 4 | Example 5 | Example 6 | Example 7 | Example 8 |
|---|---|---|---|---|---|---|---|---|---|
| Copolymerized polycarbonate resin (A) (mass %) | Copolymerized PC1 | 10 | 20 | 30 | — | — | 10 | 20 | 30 |
| | Copolymerized PC2 | — | — | — | 50 | 70 | — | — | — |
| | Copolymerized PC3 | — | — | — | — | — | — | — | — |
| Polycarbonate resin (B) (mass %) | PC-A resin 1 | 90 | 80 | 70 | 50 | 30 | — | — | — |
| | PC-A resin 2 | — | — | — | — | — | 90 | 80 | 70 |
| Glass transition temperature (Tg) (Blend of Copolymerized resin (A) and resin (B)) | ° C. | 144 | 141 | 140 | 145 | 144 | 143 | 141 | 140 |
| Thickness of unstretched film | μm | 102 | 104 | 103 | 297 | 293 | 107 | 104 | 105 |
| Re | nm | 8 | 5 | 3 | 10 | 6 | 9 | 7 | 7 |
| $\Delta n \times 10^3$ | — | 0.08 | 0.05 | 0.03 | 0.03 | 0.02 | 0.09 | 0.07 | 0.06 |
| Total light transmittance | % | 90 | 90 | 90 | 90 | 90 | 90 | 90 | 90 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Haze | % | 0.1 | 0.2 | 0.3 | 0.9 | 0.8 | 0.3 | 0.3 | 0.3 |
| Bendability |  | Good | Good | Good | Good | Good | Good | Good | Good |

Copolymerized PC1: BPEF/SPG = 60/40 (mol %)
Copolymerized PC2: BPEF/SPG/TMC = 52/24/24 (mol %)
Copolymerized PC3: BCF/SPG = 35/65 (mol %)
PC-A resin 1: Bisphenol A polycarbonate resin, specific viscosity ($\eta_{SP}$) 0.34
PC-A resin 2: Bisphenol A polycarbonate resin, specific viscosity ($\eta_{SP}$) 0.28

TABLE 2

|  |  | Comparative example 1 | Comparative example 2 | Comparative example 3 | Comparative example 4 |
|---|---|---|---|---|---|
| Copolymerized polycarbonate resin (A) (mass %) | Copolymerized PC1 | — | 100 | — | — |
|  | Copolymerized PC2 | — | — | 100 | — |
|  | Copolymerized PC3 | 30 | — | — | — |
| Polycarbonate resin (B) (mass %) | PC-A resin 1 | 70 | — | — | 100 |
|  | PC-A resin 2 | — | — | — | — |
| Glass transition temperature (Tg) (Blend of Copolymerized resin (A) and resin (B)) | °C. | 141 | 131 | 143 | 145 |
| Thickness of unstretched film | μm | 295 | 104 | 291 | 103 |
| Re | nm | — | 2 | 2 | 22 |
| Δn × $10^3$ | — | — | 0.02 | 0.01 | 0.21 |
| Total light transmittance | % | 87 | 90 | 90 | 90 |
| Haze | % | 5.3 Clouded | 0.2 | 0.8 | 0.2 |
| Bendability |  | — | Poor | Poor | Good |

INDUSTRIAL APPLICABILITY

Films formed from the resin composition or the copolymer of the present invention are significantly useful as optical films for liquid crystal display devices, organic EL display devices, head-up display devices, and the like because of their low retardation as well as excellent heat resistance, transparency, and bending resistance.

The invention claimed is:

1. A polycarbonate resin composition comprising a copolymerized polycarbonate resin (A) comprising:

as main repeating units, a carbonate unit (a-1) derived from 9,9-bis [4-(2-hydroxyethoxy)phenyl]fluorene and a carbonate unit (a-2) represented by the following formula (a-2):

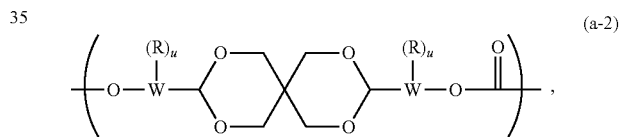

(wherein W represents an alkylene group having 1 to 20 carbon atoms or a cycloalkylene group having 6 to 20 carbon atoms, R represents a branched or linear-chain alkyl group having 1 to 20 carbon atoms or a cycloalkyl group having 6 to 20 carbon atoms optionally having a substituent, and u represents an integer of 0 to 3, and a polycarbonate resin (B) comprising, as a main repeating unit, 2,2-bis(4-hydroxyphenyl) propane, wherein
1) a molar ratio of the carbonate unit (a-1) to the carbonate unit (a-2) in the polycarbonate resin (A) is from 50/50 to 80/20, and
2) A weight ratio of the polycarbonate resin (A) to the polycarbonate resin (B) is from 1:99 to 70:30.

* * * * *